No. 869,909. PATENTED NOV. 5, 1907.
A. E. KAHN.
ANEROID BAROMETER.
APPLICATION FILED DEC. 27, 1906.

Witnesses
G. A. Forburk
J. K. Reynard.

Inventor
Adolph E. Kahn
By his Attorney
G. A. Manwaring.

THE NORRIS PETERS CO., WASHINGTON, D. C.

UNITED STATES PATENT OFFICE.

ADOLPH E. KAHN, OF NEW YORK, N. Y.

ANEROID BAROMETER.

No. 869,909.      Specification of Letters Patent.      Patented Nov. 5, 1907.

Application filed December 27, 1906. Serial No. 349,635.

*To all whom it may concern:*

Be it known that I, ADOLPH E. KAHN, a citizen of the United States, and residing in New York city, county of New York, and State of New York, have invented a new and useful Improvement in Aneroid Barometers and the Like, which is fully set forth in the following specification.

The object of my invention is to provide an accurate, easily adjustable and ready means of setting and fixing a movable scale, on what is styled an "aneroid" barometer, at any desired point, or with a given reading at any required position; more exactly to set and fix a scale of altitude, in feet in any relation to a scale of inches representing the pressure of the atmosphere in inches of a mercury column. Heretofore it has been the practice to have said scale of altitude permanently affixed to the ring holding a crystal which covers the face of the instrument, and when it became necessary to change said scale the entire ring, crystal and scale had to be moved around, against considerable and necessary friction, which resulted in making a close or exact setting impossible.

In the accompanying drawings forming a part of these specifications I have illustrated the manner in which I carry out my invention and the means used to secure that end.

Figure 1:
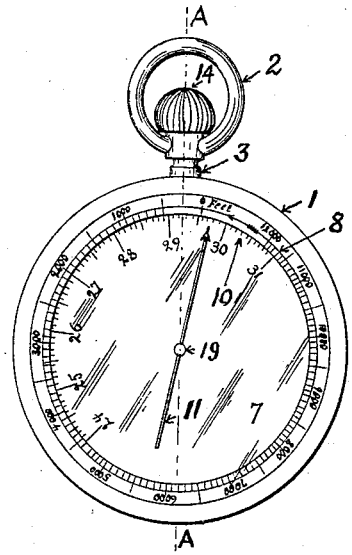
Figure 2:
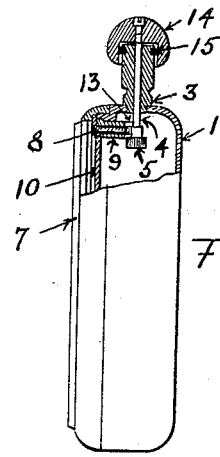
Figure 5:
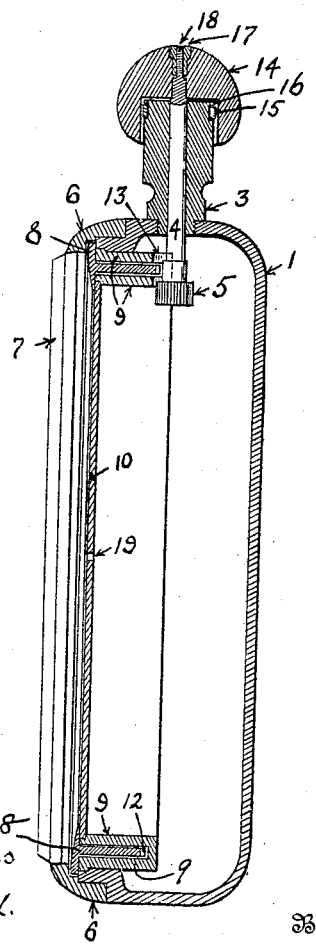
Figure 3:
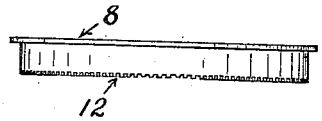
Figure 4:
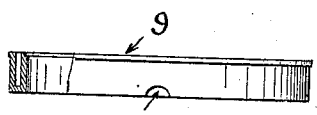

Figure 1, shows a front elevation of an aneroid barometer with a scale representing altitude in feet and a second scale showing the atmospheric pressure in inches of mercury. Fig. 2, shows a cross section of Fig. 1 on the line A A. Fig. 3, shows a side elevation of ring 8. Fig. 4, shows a side elevation of ring 9. Fig. 5, is a cross section on an enlarged scale on line A A of Fig. 1.

In all figures like parts are represented by like numerals of designation, and in which, 1 shows the case of the instrument within which are the working parts; 2 shows a ring set into the stem 3, as is usually found in watches and which may be used for attaching a carrying chain to.

4 shows a shaft running through the stem 3 and the head or cap 14, to which it is rigidly fastened by the screw 17 on the threaded shaft end 18, the upper end of said shaft below the thread being square or of any suitable cross section to avoid it turning in the head or cap 14. An annular groove 16, is made around the stem 3, within which is placed a spring 15, which bears against the opening in the head or cap 14, and by friction holding the cap either in or out as the case may be, said cap with attached stem being capable of being pushed in or out as required.

5 shows a toothed wheel rigidly fastened to the shaft 4.

Numeral 6 shows a ring into which is set the crystal 7 said ring snapping onto the case 1, as is customary with similar crystal rings in watches.

Numeral 8 shows a scale of "T" shaped cross section which is adapted to revolve in another ring 9 of "U" shaped section, said ring 9 setting into the open front of the case 1. Around the bottom edge of the ring 8 are teeth 12, adapted to engage with the teeth on wheel 5. A small part of the bottom of ring 9 is cut away at 13, to permit the teeth of wheel 5 to be pulled out to engage with the teeth in the bottom of scale 8.

Numeral 10 shows a dial rigidly fixed by friction or other suitable means to the case 1, with suitable graduations thereon.

Numeral 11 shows a hand or indicating needle actuated around the center 19 by the usual mechanism which is not part of my invention.

To illustrate the use of my invention, it may be assumed that the barometer reading as indicated by the hand 11 and scale 10, is say 29.5 inches and it is desired to set the zero of the scale of altitudes at that figure. To effect this, the stem head 14 is pulled out, causing the toothed wheel 5 to engage with the teeth 12, in the bottom of ring 8, when by revolving the head 14, the said ring 8 is caused to turn forward or backward as desired, after which the head is pushed in again so as to disengage the toothed wheel 5 from the teeth 12, so obviating any liability of disarrangement due to handling or carrying. When the head 14 is at either limit of its travel the spring 15 tends, by friction, to hold it in that position.

When my improved device is in the pocket with the head 14 pushed fully in, in its normal position, there will be no liability of the position of the scale 8 being changed on account of accidentally turning of the head, wherein lies one of the principal advantages of my device.

Having described my invention, I claim:

1. In an aneroid barometer with more than one scale on one of which are teeth; a shaft movable in the direction of its length and a pinion fixed on said shaft in combination with the scale 8 the teeth 12 the ring 9 and the head 14.

2. In an aneriod barometer with more than one scale one of said scales having teeth connected therewith, a pinion removably engageable with said teeth in combination with a slotted "U" shaped ring inclosing said teeth.

3. An aneriod barometer comprising multiple scales, the scale ring teeth 12 and the toothed wheel 5, with means for engaging and disengaging said toothed wheel with the teeth 12 and for revolving said toothed wheel.

4. An aneroid barometer comprising the scale 8, the teeth 12 the ring 9, the piston 5, the shaft 4 and the head 14.

In testimony whereof I have signed this specification in the presence of two subscribing witnesses.

ADOLPH E. KAHN.

Witnesses:
    M. E. KELLY,
    ERNEST R. FRANKS.